United States Patent
Bouchard et al.

[11] Patent Number: 5,149,345
[45] Date of Patent: Sep. 22, 1992

[54] CENTRIFUGE PURIFIER FOR A GAS FLOW

[75] Inventors: Christian Bouchard, Le Pre Saint Gervais; François Brulez, Paris, both of France

[73] Assignee: GEC Alsthom SA, Paris, France

[21] Appl. No.: 596,261

[22] Filed: Oct. 12, 1990

[30] Foreign Application Priority Data

Oct. 12, 1989 [FR] France ............... 89 13343

[51] Int. Cl.⁵ .............................. B01D 45/12
[52] U.S. Cl. .................... 55/406; 55/459.1
[58] Field of Search ............. 55/406, 459.1; 210/512.1; 209/144, 211

[56] References Cited

U.S. PATENT DOCUMENTS

| | | | |
|---|---|---|---|
| 774,851 | 11/1904 | McKee | 55/406 |
| 2,453,593 | 11/1948 | Putney | 55/406 |
| 2,708,489 | 5/1955 | Stokoe | 55/459.1 |
| 3,360,909 | 1/1968 | Barnerias | 55/457 |
| 4,610,701 | 9/1986 | Hoffman | 55/87 |
| 5,002,671 | 3/1991 | Villiers et al. | 209/144 |

FOREIGN PATENT DOCUMENTS

| | | | |
|---|---|---|---|
| 0227089 | 7/1987 | European Pat. Off. | |
| 94615 | 7/1980 | Japan | 55/406 |
| 1223968 | 4/1986 | U.S.S.R. | 55/406 |
| 186631 | 2/1923 | United Kingdom | |

*Primary Examiner*—Bernard Nozick
*Attorney, Agent, or Firm*—Sughrue, Mion, Zinn, Macpeak & Seas

[57] ABSTRACT

Particles are concentrated in a peripheral gas stream of a contaminated gas flow along a deposition length (38) of a centrifuge chamber (2). The longitudinal advance of the peripheral gas stream is then stopped in a separation length (40) in which its pressure is kept high enough by rotating blades (24) rapidly to ensure that said stream escapes to the outside via a removal opening (32) while a purified inner gas stream continues to advance longitudinally. The invention is particularly applicable to purifying smoke.

10 Claims, 2 Drawing Sheets

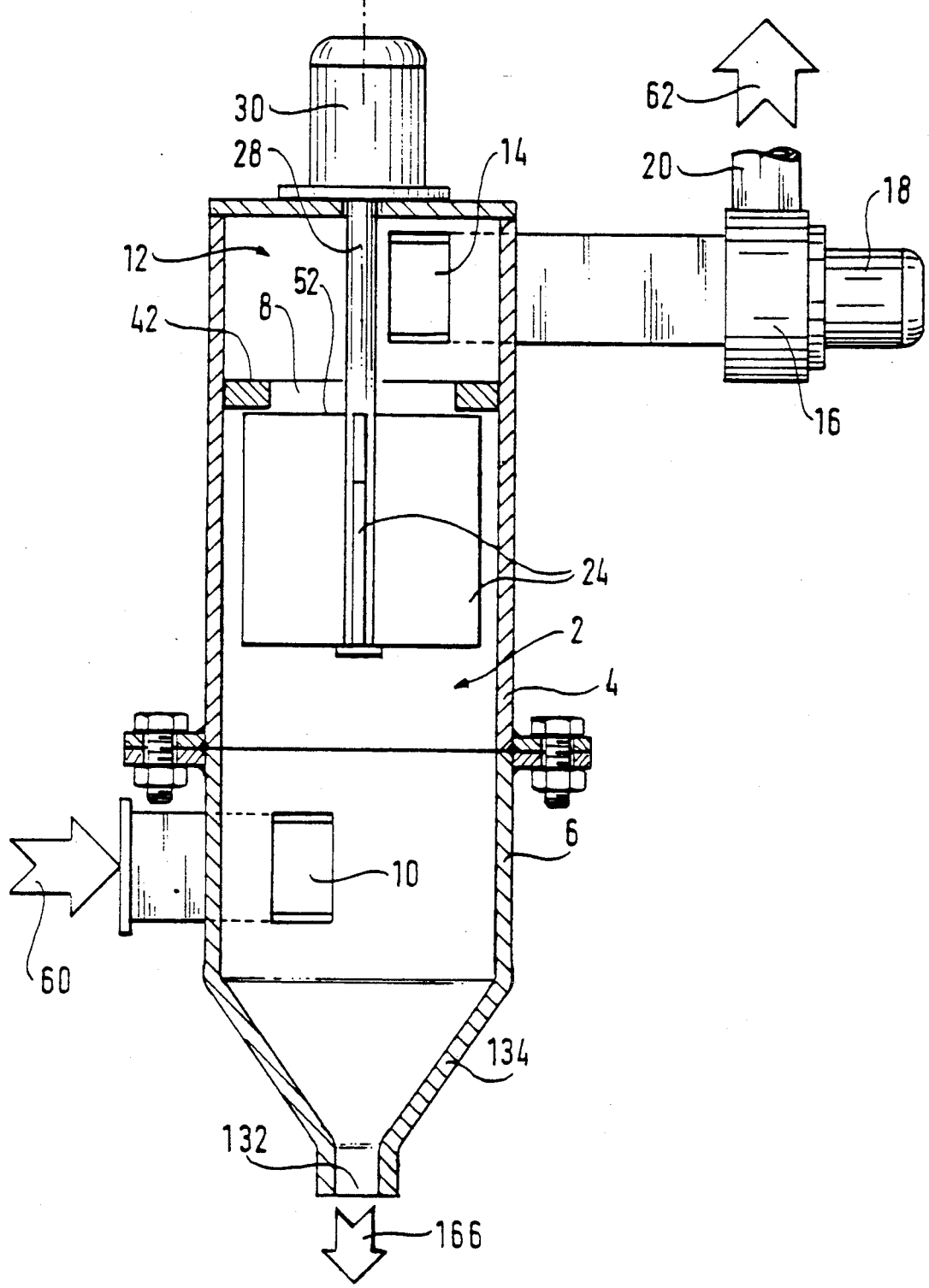

CENTRIFUGE PURIFIER FOR A GAS FLOW

FIELD OF THE INVENTION

The present invention relates to purifying a flow of gas contaminated with particles. It applies in particular to purifying a flow of air such as the aerosols that occur in numerous industries (e.g. the food industry or the pharmaceutical industry) or factory smoke prior to feeding it to the bottom of a factory chimney, or air which is fed to so-called "clean rooms" for the purpose of airing them, in hospitals, semiconductor laboratories, etc., for example. The invention appears to be particularly advantageous when the size of the particles to be extracted is a few microns or close to a micron.

BACKGROUND OF THE INVENTION

Some prior purifiers for performing such functions are complex and expensive. Others have inadequate efficiency, particularly when dealing with the finest of particles since these are the most difficult to extract from a gas flow.

A particular object of the present invention is to improve this efficiency by means of a purifier which is simple both to manufacture and to maintain.

SUMMARY OF THE INVENTION

The present invention provides a centrifugal purification method for a gas flow, the method being characterized by the fact that particles are initially concentrated in a peripheral gas stream in a centrifugal separation chamber by centrifuging, the longitudinal advance of said stream then being slowed down while a purified inner gas stream continues its longitudinal advance unhindered, said particles being extracted from said centrifuge chamber after being slowed down longitudinally together with said peripheral gas stream.

The present invention also provides a centrifugal purifier for a gas flow contaminated with particles, the purifier comprising:

a centrifuge chamber delimited by a confinement wall which is circularly symmetrical about a longitudinal axis, said chamber having a length extending along said axis in a forwards direction from an upstream end to a downstream end;

an inlet opening formed at said upstream end of said chamber to receive an inlet gas flow constituted by a carrier gas contaminated with particles that are to be removed therefrom;

an outlet opening formed at said downstream end of said chamber for delivering a purified gas flow;

flow means for causing said carrier gas to flow from said inlet opening to said outlet opening, thereby forming an internal gas flow having a longitudinal velocity component in said forwards direction;

spin means for imparting rotation to said internal gas flow around said axis, thereby causing centrifugal force to appear and concentrate said particles in the vicinity of said confinement wall in a centrifugal deposition length extending over a fraction of the length of said centrifuge chamber; and a removal opening for the particles which have been concentrated in this manner close to said confinement wall;

the purifier being characterized by the fact that it includes a peripheral obstacle disposed downstream from said deposition length, projecting radially into said centrifuge chamber so as to at least slow down the longitudinal displacement of a peripheral gas stream constituted by a fraction of said internal gas flow and containing said particles concentrated by the centrifugal force, while enabling an inner gas stream constituted by the remainder of said internal gas flow to flow longitudinally in said forwards direction;

said removal opening being disposed to receive said particles from said peripheral stream as slowed down by said peripheral obstacles.

An implementation of the present invention in the context of the above definition is described below in greater detail by way of non-limiting example and with reference to the accompanying diagrammatic figures. When the same item appears in more than one of the figures, it is designated in all of them by the same reference symbol.

BRIEF DESCRIPTION OF THE DRAWINGS

FIG. 3 is a view of a second purifier of the present invention, with its centrifuge chamber being shown in axial section.

DESCRIPTION OF PREFERRED EMBODIMENTS

Figure 1:
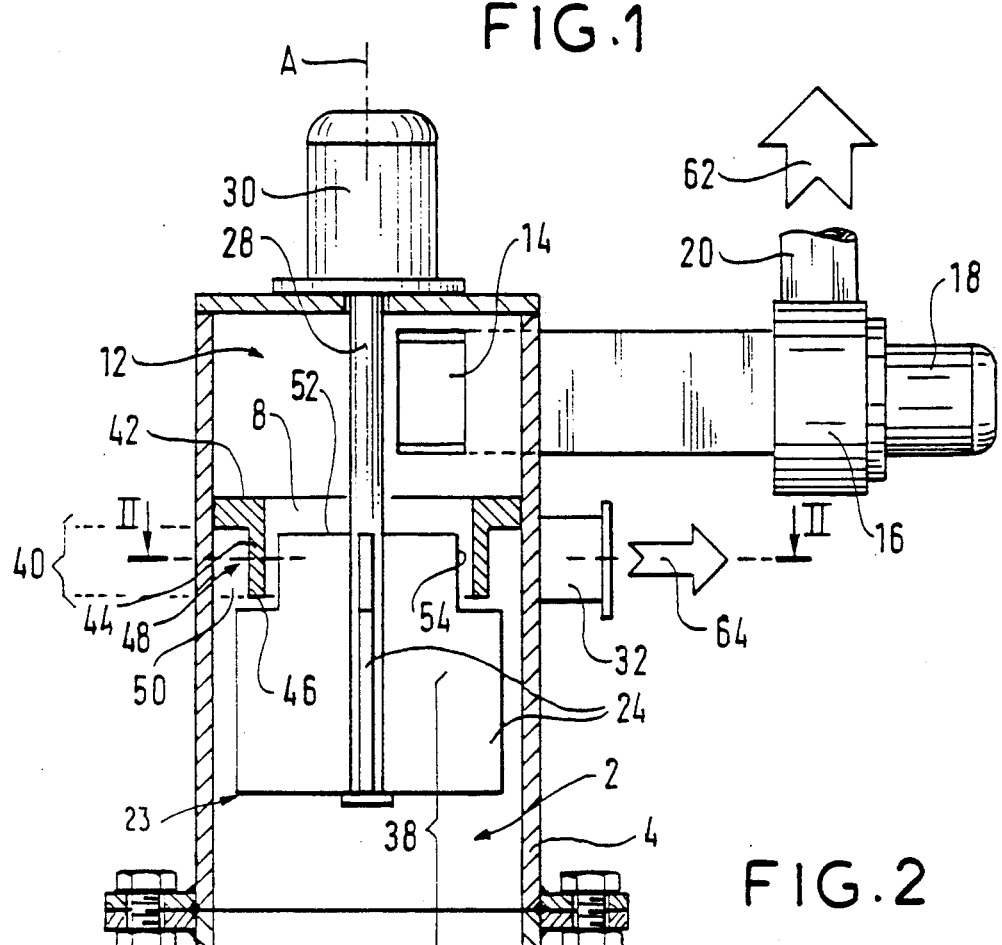
FIG. 1 is a view of a first purifier of the present invention with its centrifuge chamber being shown in axial section.

As shown in FIG. 1, the separator comprises a centrifugal separation chamber 2 having a cylindrical confinement wall 4 about a vertical axis A which defines said longitudinal direction. This chamber extends between a bottom end 6 and a top end 8. It has:

an inlet opening 10 for tangentially admitting a flow of contaminated gas; and an outlet opening constituted by its top end 8. This opening communicates with an outlet enclosure 12 from which the flow of gas is extracted in order to reach a separator outlet 20 via a tangential outlet opening 14 and an outlet fan 16. The fan is driven by a motor 18 to suck said carrier gas. The fan constitutes flow means for causing said gas to flow from said inlet opening 10 to said outlet opening 14 with a longitudinal velocity component in a forward flow direction which is the upwards direction.

The purifier also includes spin means constituted by a driving rotor 23 having blades 24 fixed to a shaft 28 to be rotated about the axis A. Each blade is essentially in the form of a plate whose length extends parallel to the axis and whose width extends radially. The rotor is provided with a motor 30 which rotates at 3,000 revolutions per minute (rpm) or 5,000 rpm, for example, so as to cause centripetal acceleration to appear at the peripheral edges of said drive blades, said acceleration lying in the range 500 times to 20,000 times the acceleration due to gravity (g).

Figure 2:
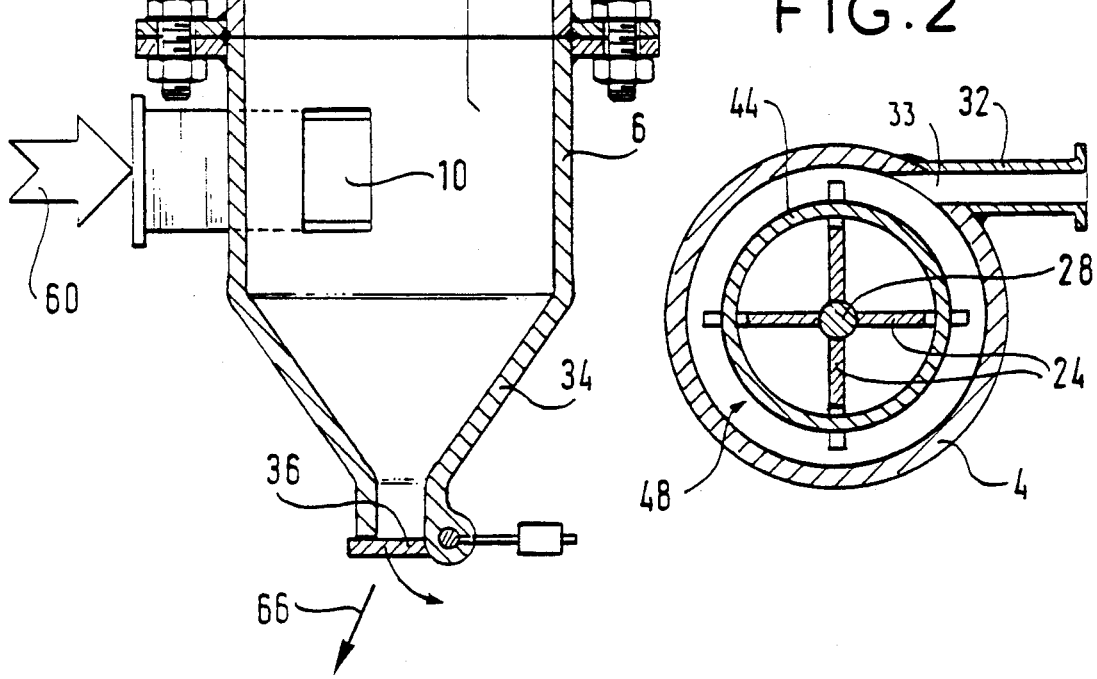
FIG. 2 is a cross-section view on line II—II of FIG. 1 through the separator chamber of the same purifier.

The removal means 32 include a tangential removal opening 33, FIG. 2, which is described in greater detail below. They also include:

a heavy particle collecting funnel 34 formed beneath the said inlet opening for collecting heavy particles which are separated out by centrifugal force and by gravity in said deposition length; and heavy particle removal means 36 for enabling the heavy particles collected in this way to be extracted without letting air into the chamber while said flow means and said spin means are in operation. These heavy particle removal means include, for example, a plug 36 which closes the bottom of the funnel 34 while the purifier is in operation, and which is removed after the purifier has been stopped and once an excessive quantity of heavy particles has accumulated.

A deposition section 38 and a separation section 40 extend lengthwise in succession along the length of the centrifuge chamber from inlet opening upwardly.

A separation device constitutes a peripheral obstacle and comprises:

a stop ring 42 disposed to project inwards from the wall of said centrifugal separation chamber; and a cylindrical stream separator 44 integral with ring 42 extending longitudinally in the direction upstream from the radially inside edge of said ring 42 to a separator edge 46. An annular removal chamber 48 is thus formed between the cylindrical separator 44 and the wall of the centrifuge 4, said annular removal chamber having an upstream annular opening 50 for receiving said peripheral stream of gas and at least one peripheral tangential opening 33, FIG. 2, constituting said removal opening.

Because the fan 16 is disposed downstream from the separator edge 46, the gas in said central gas stream through a section of said stream passing said edge 46 can be given a relatively low mean absolute pressure which is preferably at least 10% less than said extraction pressure.

The drive blades 24 extend mainly upstream from the separator edge 46. They include extensions 52 downstream from said separator edge so as to impart a peripheral pressure to a peripheral portion of the gas in said inner stream of gas passing in the vicinity of said edge, said peripheral pressure being close to said extraction pressure and being substantially greater than a central pressure that exists in the central portion of the same section of said inner stream.

The outer edges of the blades pass at a small distance from the edge 46 of the cylindrical separator 46. This distance is preferably less than 10% and even more preferably less than 4% of the diameter of said edge. The blades have notches 54 to avoid coming into contact with the separator device 42, 44.

Arrows 60, 62, 64, and 66 respectively represent: the inlet flow; the purified outlet flow from the purifier; an outlet flow having a high concentration of fine particles from the peripheral gas stream; and intermittent removal of the heavy particles.

The dispositions described above enable very fine particles to be extracted and, in particular, they have the advantage that the surfaces that are obtained by boilermaking, and in particular the blades 24, especially if they are in the form of plates, can all be made easily from abrasion-resistant material and/or can easily be covered with such a material, particularly in the form of wear plates.

The second purifier shown in FIG. 3 is generally analogous to the above-described first purifier. Items of the second purifier that are similar to items of the first purifier are given the same reference numbers.

The second purifier differs from the first in the following respects: the peripheral obstacle does not constitute a stream separator stop ring such as 42, 44, but merely a device 14 for stopping the longitudinal advance of the peripheral stream. On making contact with this stop ring 14, the peripheral stream is constrained to move in towards the axis A and to mix with the axial inner stream. The drive blades 134 are rectangular. The particles in the peripheral stream are deposited on the stop ring 14 and fall under gravity towards a removal opening 132 formed at the bottom of a funnel 134 which is disposed in the same way as the funnel 34. They are removed continuously as represented by arrow 166.

We claim:

1. In a centrifugal purifier for a gas flow contaminated with particles, said purifier comprising:

a centrifugal separation chamber (2) delimited by a cylindrical confinement wall (4) which is circularly symmetrical about a longitudinal axis (A), said chamber having a length extending along said axis in a forward flow direction from an upstream end (6) to a downstream end (8);

an inlet opening (10) formed at said upstream end of said chamber to receive an inlet gas flow constituted by a carrier gas contaminated with said particles that are to be removed therefrom;

an outlet opening (8) formed at said downstream end of said chamber for delivering a purified gas flow;

flow means (16) for causing said carrier gas to flow from said inlet opening to said outlet opening through said cylindrical confinement wall, thereby forming an internal gas flow within said cylindrical confinement wall having a longitudinal velocity component in said forward direction, axially of said cylindrical confinement wall;

spin means (24) for imparting rotation to said internal gas flow around said axis, thereby causing centrifugal force to concentrate said particles in the vicinity of said cylindrical confinement wall along a centrifugal deposition section (38) extending over a fraction of the length of said centrifugal separation chamber; and a removal opening within said cylindrical confinement wall for the particles which have been concentrated in this manner close to said cylindrical confinement wall;

the improvement wherein said cylindrical confinement wall includes a peripheral obstacle (42, 44) disposed downstream from said desposition section, projecting radially out from said cylindrical confinement wall into said centrifugal separation chamber downstream of said spin means (24) so as to at least slow down the longitudinal displacement of a peripheral gas stream constituting a nonseparate fraction of said internal gas flow containing said particles concentrated by the centrifugal force, and said peripheral obstacle being axially open thereby enabling a radially inner gas stream constituting the remainder of said internal gas flow to flow longitudinally in said forward flow direction downstream of said peripheral obstacle within said centrifugal separation chamber;

said removal opening (33) being disposed within said cylindrical confinement wall at the level of said spin means just upstream of said peripheral obstacle to receive said particles from said peripheral stream as slowed down by said peripheral obstacle.

2. A purifier according to claim 1, wherein said centrifugal separation chamber (21) further includes:

a particle collecting funnel (34) formed beneath said inlet opening (1) for collecting particles that have been deposited by gravity from said peripheral stream; and particle removal means (36) for extracting the collected particles.

3. A purifier according to claim 1, wherein said removal opening (32) is formed within said cylindrical confinement wall downstream from said centrifugal deposition section, said peripheral obstacle further comprising a cylindrical separator (42, 44) for selectively guiding said peripheral gas stream towards said removal opening and for causing said peripheral gas stream to flow continuously through said removal opening towards a particle receiving space external to said centrifugal separation chamber;

said spin means (24) simultaneously constituting centrifugal compressor means for imparting sufficient extraction pressure to said carrier gas content of said peripheral gas stream to ensure that said gas is extracted into said particle-receiving space.

4. A purifier according to claim 3, wherein said peripheral obstacle comprises integrally:

a stop ring (42) projecting radially inward from the wall of said centrifuge chamber; and a cylindrical stream separator (44) extending longitudinally in an upstream direction from the radially inside edge of said stop ring, and terminating in a separator edge (46) axially remote from said ring and upstream thereof, thereby forming an annular evacuation chamber (48) between said cylindrical separator and said centrifuge wall (4), said annular evacuation chamber having an annular opening (50) facing upstream to receive said peripheral gas stream, and at least one peripheral opening (33) within said cylindrical confinement wall constituting said removal opening.

5. A purifier according to claim 4, wherein said flow means comprise an outlet fan (16) operatively disposed downstream from said separator edge (46) so as to impart a mean absolute pressure to the gas of said radially inner gas stream in a section of said inner gas passing said edge, of at least 10% less than said extraction pressure.

6. A purifier according to claim 4, wherein said spin means comprise a drive motor rotating about said axis (A), and a shaft extending from said motor axially into said cylindrical confinement wall (4), and radial drive blades axially upstream from said separator edge (46) fixed to said shaft and rotating therewith.

7. A purifier according to claim 6, wherein said drive blades include axial extensions (52) downstream from said separator edge (46) radially inside said cylindrical stream separator, thereby imparting a pressure to a peripheral portion of the gas of said radially inner gas stream passing axially interiorly of said cylindrical stream separator in the vicinity of said separator edge, said peripheral pressure being close to said extraction pressure and substantially greater than a pressure which exits in a central portion of the radially inner gas stream.

8. A purifier according to claim 7, wherein outer edges of at least some of said drive blades (24) pass at a small distance from said separator edge (46), said distance being preferably less than 10% and more preferably less than 4% of the diameter of said edge.

9. A purifier according to claim 1, wherein said spin means include radial drive blades (24) rotating about said axis (A), with each of said drive blades being substantially in the form of a rectangular plate whose length extends parallel to said axis (A) and whose width is disposed radially thereof.

10. A purifier according to claim 9, wherein said drive blades (24) are driven by a motor (30) causing centripetal acceleration at the radially outer peripheral edge of the blades in the range of 500 times to 20,000 times the acceleration due to gravity (g).

* * * * *